UNITED STATES PATENT OFFICE.

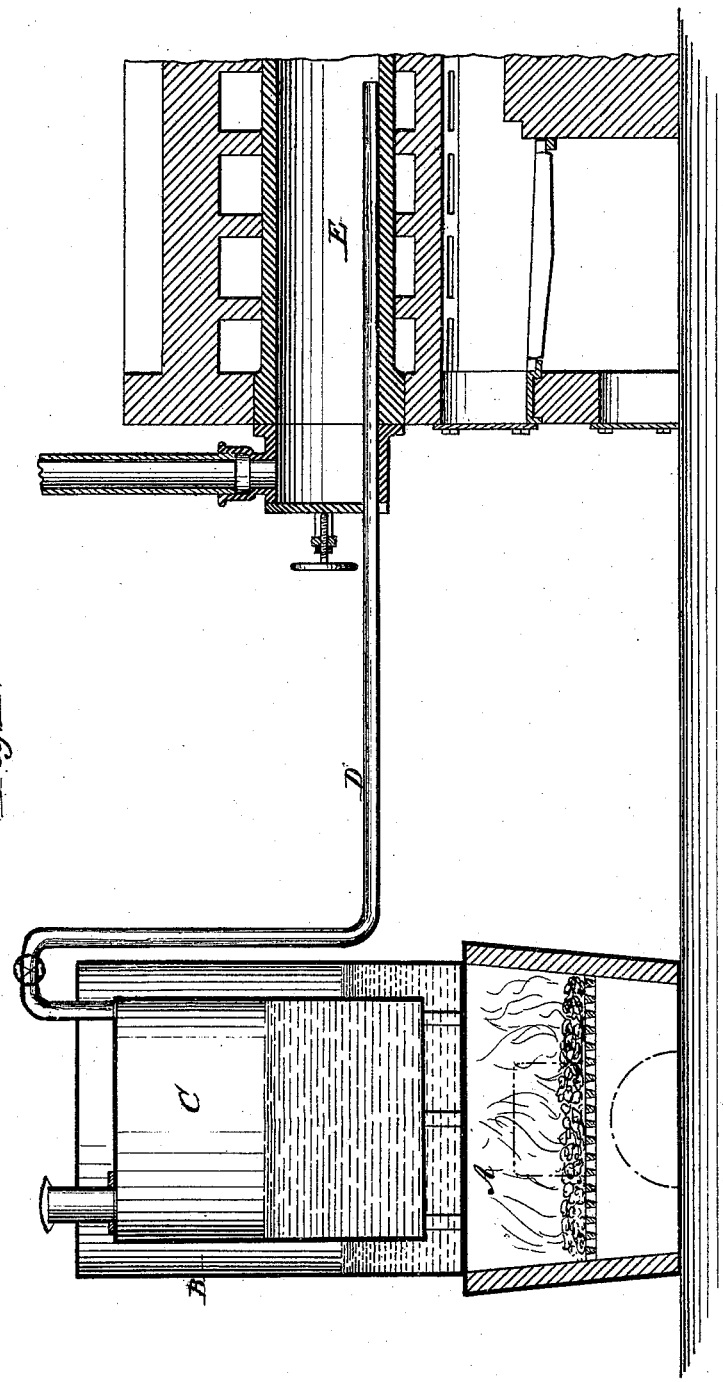

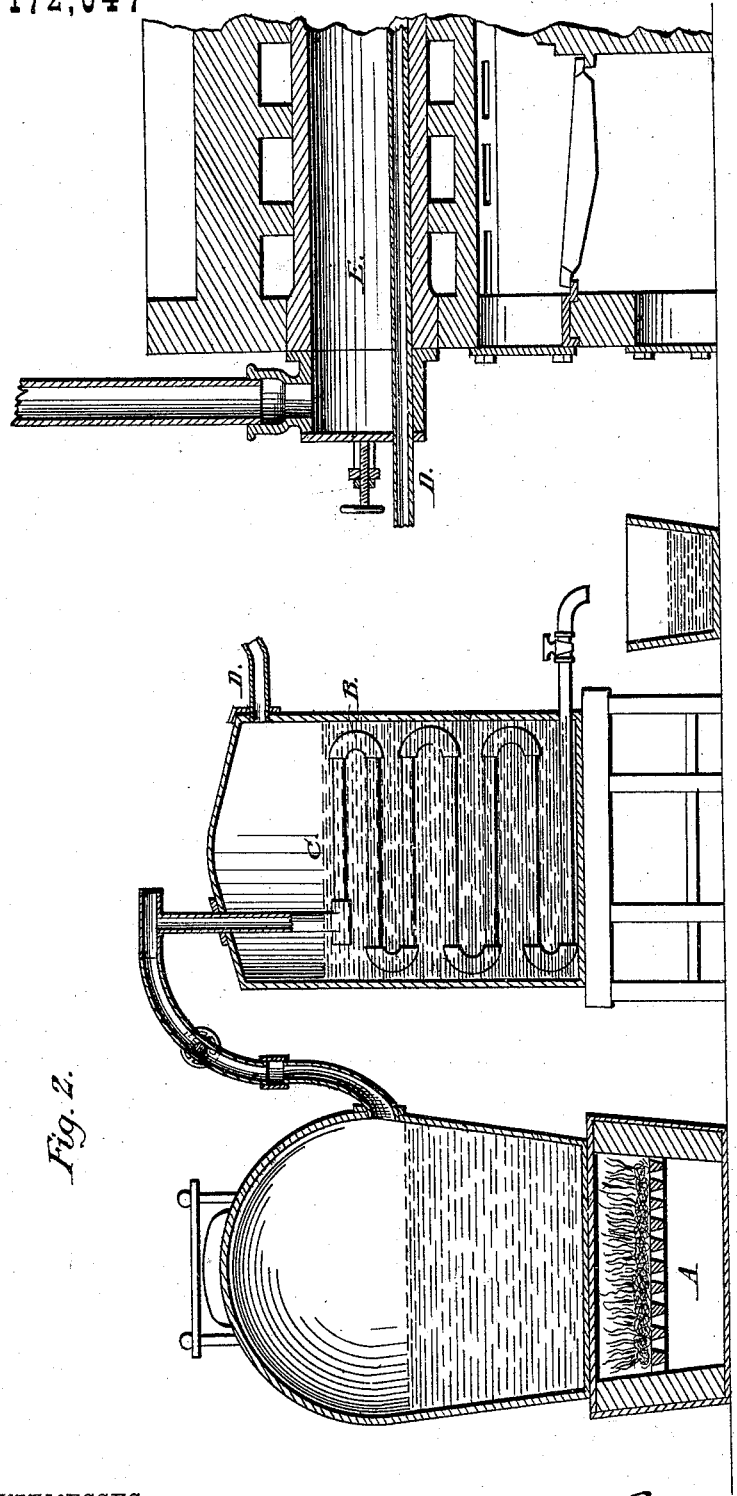

GEORGE OLNEY, OF BROOKLYN, ASSIGNOR TO THE EQUITABLE GAS LIGHT AND CONSTRUCTION COMPANY, OF NEW YORK, N. Y.

IMPROVEMENT IN MANUFACTURE OF ILLUMINATING-GAS.

Specification forming part of Letters Patent No. 172,047, dated January 11, 1876; application filed April 24, 1875.

CASE A.

*To all whom it may concern:*

Be it known that I, GEORGE OLNEY, of the city of Brooklyn, in the county of Kings and State of New York, have invented certain new and useful Improvements in Process and Apparatus for the Manufacture of Illuminating-Gas; and I do hereby declare that the following is a full, clear, and exact description thereof, which will enable others skilled in the art to which it pertains to make and use the same, reference being had to the accompanying drawing, and to the letters of reference marked thereon, which form a part of this specification.

This invention relates to the manufacture of a fixed gas; and consists in a new process, and in apparatus whereby gas is manufactured directly from a liquid hydrocarbon, by heating a body of such hydrocarbon in a closed vessel, by means of a water, steam, or air jacket, or its equivalent, a steam-coil heated in the exterior of the vessel. I prefer to obtain the heat for the closed vessel containing the hydrocarbon from a fire separate and distinct from that by which the fixing-retorts are heated. The hydrocarbon vapors generated are conveyed into heated retorts, where they are converted into a fixed gas. This gas may be used alone, or may be mixed with other gas to improve the same.

The accompanying drawings illustrate apparatus by means of which my process may be carried into effect.

A is a furnace for heating the hydrocarbon. C is a closed vessel or still containing a liquid hydrocarbon. The still is charged through a suitable opening. D is a pipe, which conveys vapors from the vessel C to any number of fixing-retorts E, from which they pass out through the stand-pipe.

Heat being applied to the hydrocarbon by means of the furnace A, vapors are generated in the closed vessel C, which pass through the pipe D into the heated retort, and are there converted into a fixed and permanent gas.

Having thus described my invention, what I claim, and desire to secure by Letters Patent, is—

1. The process of producing a fixed gas directly from hydrocarbon, by heating the hydrocarbon through a water, steam, or air jacket, and passing the resultant vapors into a heated retort, where they are converted into a fixed gas, substantially as described.

2. The closed vessel C, jacket B, pipe D, and retort E, substantially as and for the purpose set forth.

In testimony that I claim the foregoing as my own, I have affixed my signature in presence of two witnesses.

GEORGE OLNEY.

Witnesses:
INGERSOLL LOCKWOOD,
CHAS. H. NEILSON.